United States Patent [19]
Ozeki et al.

[11] Patent Number: 4,848,022
[45] Date of Patent: Jul. 18, 1989

[54] HANDLE FOR A FISHING ROD

[75] Inventors: Takafumi Ozeki, Saitama; Kikuo Sakai, Tokyo; Noriyasu Fukushima, Saitama, all of Japan

[73] Assignee: Daiwa Seiko, Inc., Tokyo, Japan

[21] Appl. No.: 275,227

[22] Filed: Nov. 22, 1988

[30] Foreign Application Priority Data

Nov. 25, 1987 [JP] Japan .............................. 62-178973[U]
Dec. 9, 1987 [JP] Japan .............................. 62-187433[U]

[51] Int. Cl.[4] .............................................. A01K 87/00
[52] U.S. Cl. ............................................ 43/23; 43/22; 43/18.1
[58] Field of Search ................... 43/18.1, 23, 18.5, 22

[56] References Cited
U.S. PATENT DOCUMENTS

| | | | |
|---|---|---|---|
| 3,034,798 | 5/1982 | Portz | 43/23 |
| 4,516,351 | 5/1985 | Highby | 43/23 |
| 4,644,680 | 2/1987 | Dawson | 43/23 |
| 4,649,661 | 3/1987 | Myojo | 43/23 |
| 4,653,215 | 3/1987 | Strader | 43/18.1 |

*Primary Examiner*—M. Jordan
*Attorney, Agent, or Firm*—Kalish & Gilster

[57] ABSTRACT

The handle for a fishing rod according to the present invention can improve the sense of fit of the fingers with respect to a reel-attaching portion when said portion is taken hold of. The handle comprises a reel-depositing surface of the reel-attaching portion expanded in both right and left directions to form a bulgy portion which makes the width of said surface larger than that of a reel-foot. In accordance with the reel-depositing surface, the finger-placing surface of the reel-attaching portion is formed to have a large circular surface area which fits well with the dispositions and the bending angle of the fingers. This configuration is very advantageous in giving an improved sense of fit of the fingers with respect to the finger-placing surface of the reel-attaching portion and also a comfortable and safe gripping performance. Further, as the reel-attaching portion is formed thin enough for the lower surface of the outer periphery of the fishing rod to be exposed on the lower portion thereof, a firm and stable gripping performance can be obtained; and further the vibration of the rod can be sensed directly, so a user doesn't miss any chance to operate his rod and reel when fish hit and can have a better fishing result.

4 Claims, 7 Drawing Sheets

HANDLE FOR A FISHING ROD

BACKGROUND OF THE INVENTION

This invention relates to a handle for a fishing rod on which a reel can be set. In more detail, the present invention is related to a handle for a fishing rod which gives a user a better sense of fit of the fingers to the reel-attaching portin when he takes hold of it.

Handles for a casting rod on which a bait-casting reel and the like can be set have been known. For example, Laying Open Print of Japanese Patent No. 177933/1986 and Laying Open Print Japanese Utility Model No. 45971/1987 recite such handles.

The conventional handles for a casting rod have been made semicircular or rectangular in the cross section, wherein the reel-depositing surface is flat and the finger-coated phace is shaped circular or square.

In case of the handle for a casting rod as mentioned above, the casted line is rolled around the reel by pressing at least the first, second and third fingers of one hand against the reel-attaching portion of the handle from the under surface thereof, pressing the The reel-depositing surface 6 has a circular bulgy portion 6a extending in both right and left directions thereof (the upper and lower sides in FIG. 1), and constitutes an oval shape with both of the front and rear end portions thereof reduced in thickness towards the front grip 4 and the rear grip 2 respectively. This configulation makes the width D of the bulgy portion 6a of the reel-depositing portion 6 larger than the width D of the reel foot 11a (see FIGS. 4 and 5). Also, the surface 7a of the finger-placing hollow portion 7 corresponding to the bulgy portion 6a of the abovementioned reel-depositing surface 6 is, as shown in FIG. 2, shaped to have a circular surface with much larger diameter than the outer diameter of the fishing rod 5 as it extends from the exposed outer periphery of the rod 5 towards both end peripheries of the bulgy portion 6a. This circular finger-placing surface 7a is given a favorable angle for a finger (the first finger, for example) to bend, and assures a comparatively large contacting area.

It should be noted here that the size and the diameter of this circular surface vary depending upon not only the size of a reel which is to be set upon the reel-depositing surface but also the thickness of a fishing rod.

On the front edge size of the reel depositing surface 6 is provided a fixing means 8 to interlock one end of the reel-foot 11a, in such a manner that it can

DESCRIPTION OF THE PREFERRED EMBODIMENTS

Hereinafter the embodiments of the present invention will be described by referring to the drawings.

Figure 1:
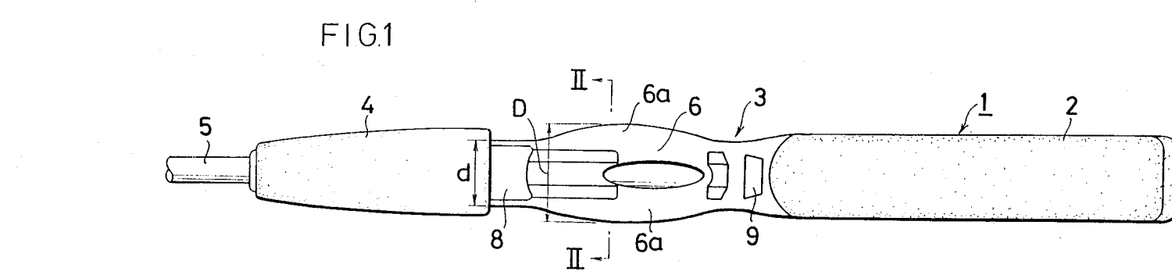
FIG. 1 is a plan view showing the first embodiment of the handle for a fishing rod according to the present invention.
Figures 2, 3:
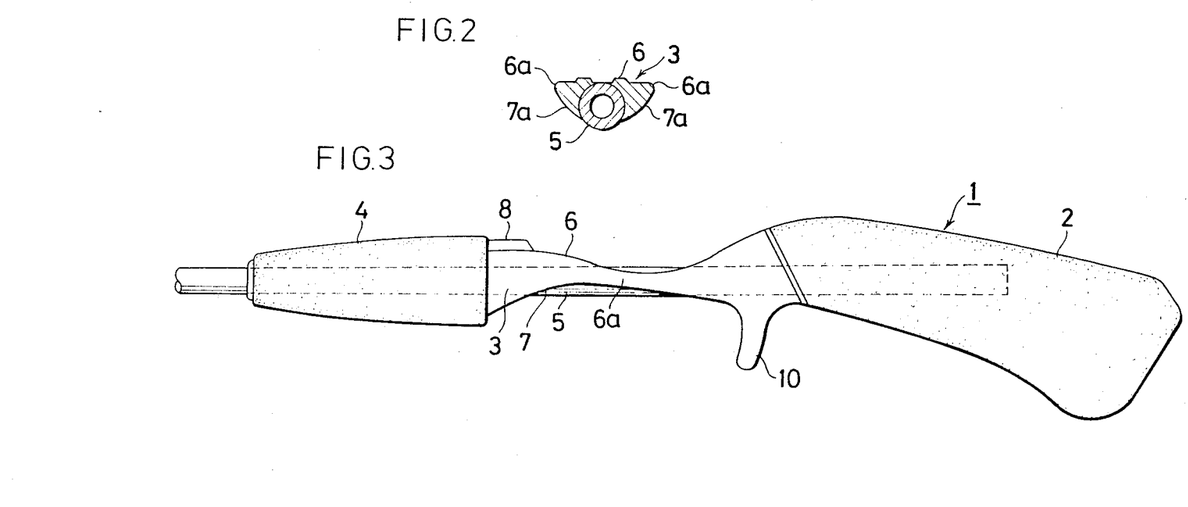
FIG. 2 is a sectional view cut along the line II—II of FIG. 1.
FIG. 3 is a side view of FIG. 1.

FIGS. 1 to 3 show the first example of the handle for a fishing rod according to the present invention, wherein the numeral 1 indicates the handle portion.

This handle portion 1 is composed of a rear grip 2 made of synthetic resin with the surface thereof covered with a cork or rubber layer, a reel-attaching portion 3 combined to the front edge of the rear grip 2 and integrally molded of synthetic resin, and a front grip 4 combined to the front edge of the reel-attaching portion made of synthetic resin with the surface thereof covered with a cork or rubber layer. Through the axial center of these front grip 4, reel-attaching portion 3 and rear grip 2 is inserted a fishing rod 5 which extends from the front edge of the front grip 4 to the approximately middle portion of the rear grip 2, and is firmly fixed.

The upper surface of the reel-attaching portion 3 is depressed to form a hollow portion 6 for depositing a reel with part of the fishing rod 5 exposed. Likewise, the lower surface thereof is depressed to form a hollow portion 7, with part of the fishing rod exposed, on which the first, second and third fingers are placed. is formed in a downwardly projecting manner, right and left side portions are formed on the reel-attaching portion so that the lower surface of the outer periphery of the fishing rod may be exposed over the front lower part of the trigger, the right and left sides are tapered so that they are higher than the approximately central line of the fishing rod at the front portion thereof and lower than that at the rear portion thereof.

According to the present invention, the bulgy portions make the reel-depositing surface of the reel-attaching surface enlarged in right and left directions and wider than the reel-foot, and moreover the finger-placing surface of the reel-attaching portion is shaped, in correspondence to the reel-attaching surface, to have a circular phace with a large surface area which fits with the dispositions and bending angles of the fingers, with a favorable result that the sense of fit of the fingers with respect to the finger-placing surface of the reel-attaching portion is improved and a handle which is safe as well as comfortable to hold can be obtained.

Still further, according to the present invention, the reel-attaching portion is made thin enough for the outer lower periphery of the fishing rod to be exposed, so the handle is comfortable and stable to hold. Further, the vibration of the rod can be sensed directly, so a user doesn't miss any chance to operate his fishing rod and reel and can enjoy a better fishing result. of the first finger and the like with respect to the reel-attaching portion as well as a comfortable gripping performance without any fear of giving pain or damage to the fingers.

Another object of the present invention is to provide a handle for a fishing rod, wherein the reel-attaching portion is made thin enough for part of the fishing rod to be exposed on the lower side thereof so that a bait-casting reel can be stably and comfortably held in the hand with the fingers touching the exposed surface and also the vibration of the fishing rod due to the hit of fish can be effectively sensed.

The present invention is to provide a handle for a fishing rod having a reel-attaching portion positioned between front and rear grips, wherein a reel-depositing surface is formed on the upper surface of the reel-attaching portion, the right and left portions of the reel-depositing surface bulge horizontally to form bulgy portions, and the finger-placing surface of the reel-attaching portion on the opposite side of the reel-depositing surface has such a circular shape as to fit with the dispositions and the bending angles of the fingers.

Further, the present invention is to provide a handle for a fishing rod having a reel-attaching portion positioned between front and rear grips, wherein a reel-depositing surface is formed on the upper surface of the reel-attaching portion, a trigger for resting a finger thumb against the upper surface of the reel, thus holding the entire handle including the reel, and thereafter operating the handle with the other hand. Since the contact phace of the reel-attaching portion and the first, second and third fingers (hereinafter simply referred to as "the first finger and the like") are of semicircular or square shape corresponding to the width of the reel foot, the first finger and the like are restricted on the under surface of the reel and their contact area to the reel-attaching portion is reduced to a small one. This leads to the disadvantage that a good sense of fit is not obtained and further the handle is awkward to hold. If the handle is held tightly to get a sense of fit, parts of the finger and the like are forced to be pressed against the reel-attaching portion so much that a user feels pain. Still more, there is a fear of hurting the finger tip because it is sometimes pressed against the square parts of the reel too hard or it may be drawn into the gap between the reel attaching portion and the reel.

SUMMARY OF THE INVENTION

The primary object of the present invention is to provide a handle for a fishing rod free from the drawbacks mentioned above, and in more particularly a handle for a fishing rod which brings about a good fit slide in the extending direction of the handle 1. Further, on the rear end side of the reel-depositing surface 6 is formed a hollow 9 into which the other end of the reel-foot 11a is interlocked. The numeral 10 is a trigger for a finger to rest on, which is provided in a projecting manner on the lower surface of the rear end portion of the reel-attaching portion 3.

Figure 4:
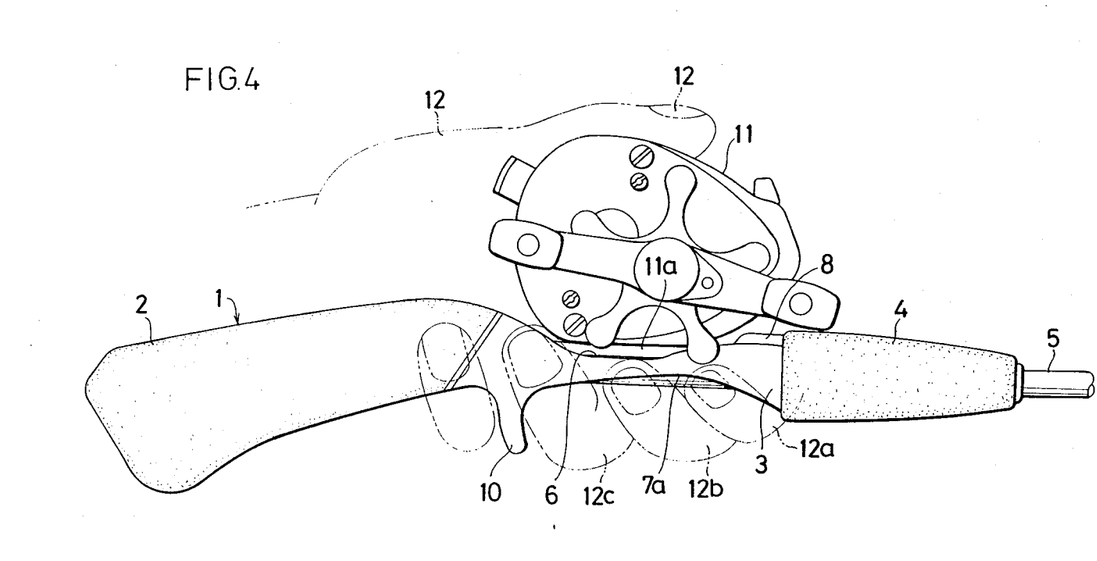
FIG. 4 is a side view showing the state where the handle for a fishing rod according to the present invention is attached with a reel and held by the hand.

The reel 11 is set on the handle for a fishing rod according to the present invention by attaching both end portions of the foot part 11a of the reel 11 to the hollow 9 and the fixing means 8 of the reel-attaching portion 3 respectively, as shown in FIG. 4.

When you do a reeling operation of the reel 11 fixed on the handle, as also seen from FIG. 4, you should put the second joint portions of your first finger 12a, second finger 12b and third finger 12c of your hand 12 against the finger-placing surface 7a of the hollow portion 7 of the reel-attaching portion 3 and cover the surface 7a with these fingers; then press your thumb 12d upon the upper side surface of the reel 11 and hold the whole reel-attaching portion 3 including the reel 11. As you can see, the fingers which are pressed against the exposed surface of the finshing rod as well as the finger-placing surface 7a of the hollow portion 7 of the reel-attaching portion 3 are bent in accordance with the shapes of these surfaces. The exposed surface of the fishing rod 5 and the successively connected finger-placing surface 7 are so shaped that the fingers can bend easily and smoothly, and further the finger-placing surface 7a is so shaped as to expand from the center of the fishing rod 5 towards both of the lower sides of the reel 11, with the result that the contact area of the reel-attaching portion 3 with the fingers becomes larger. This leads to the advantages that an improved fit of the fingers to the reel-attaching portion 3 can be obtained; a stable gripping of the handle 1 including the reel 11 is obtained; the user feels less tired in the hands even when he goes on fishing for a long time; and the user feels little pain in the fingers even if he holds the handle 1 as well as the reel 11 firmly when he fights with the fish on the line.

The reel-depositing surface 6 of the reel-attaching portion 3 is circularly bulged in right and left directions, with the fishing rod 5 at the center, in order to make the reel-depositing surface 6 larger in width and reduce the gap 13 (see FIG. 5) formed between both side flames 11b and the reel-attaching portion 3. This configuration is very advantageous in preventing the finger tip from being drawn into the gap 13 and getting hurt.

Accordingly, the above-mentioned embodiment can present a handle for a fishing rod which is improved in gripping and also safe and superior in operation.

Figures 5, 6:
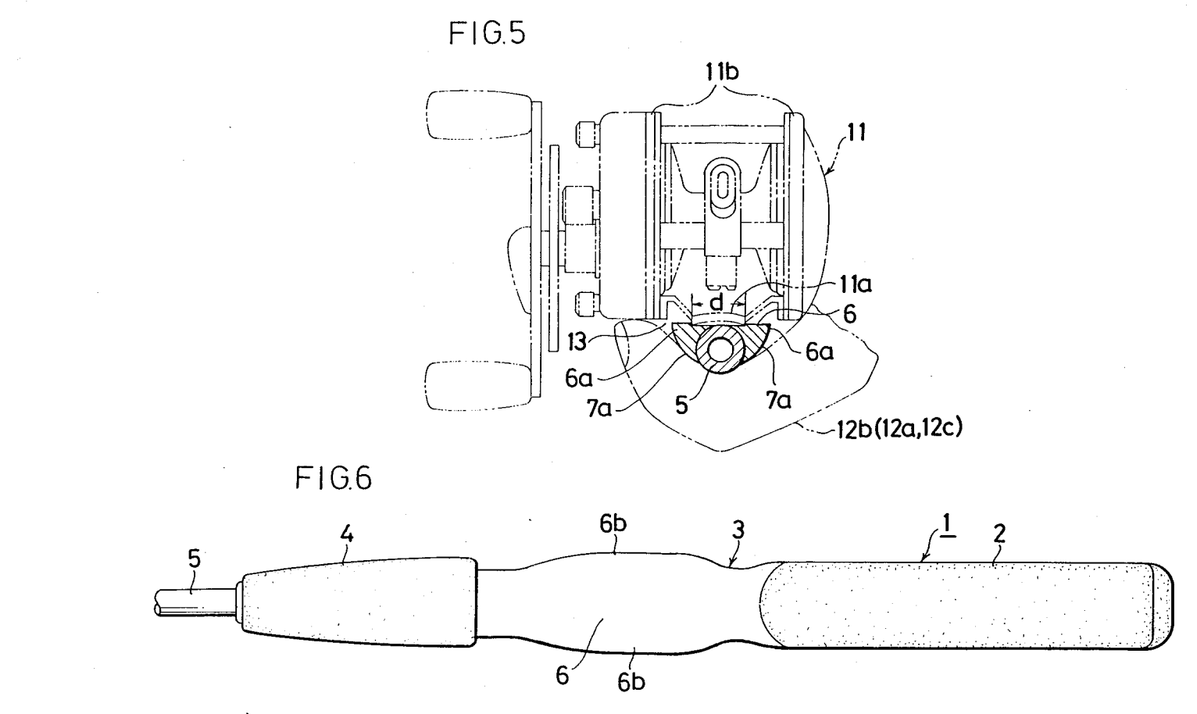
FIG. 5 is an explanatory view of FIG. 4.
FIG. 6 is a rough plan view of the second embodiment of the handle for a fishing rod according to the present invention.

FIG. 6 shows the second embodiment of the present invention.

FIG. 6 shows almost the same embodiment as FIG. 1 (the same numerals include the same parts or means), except that the reel-depositing surface 6 formed on the reel-attaching portion 3 has the bulgy portion 6b extended longer in an extending direction. This second embodiment is suitable for attaching a big reel.

Figure 7:
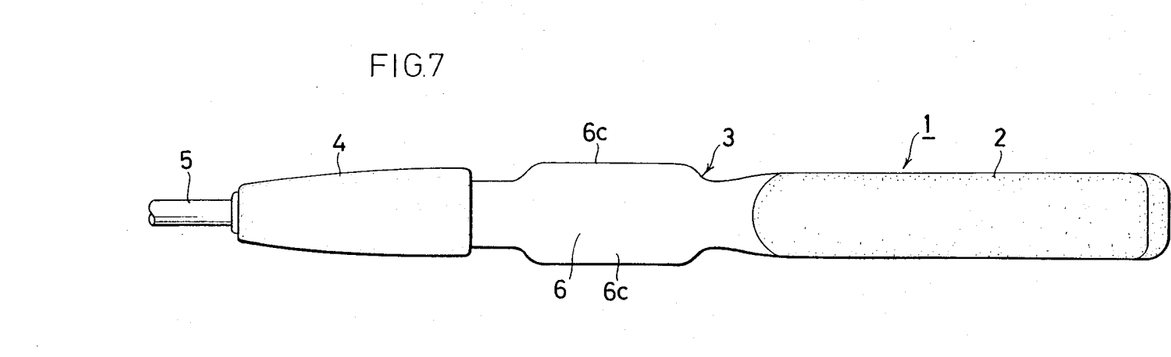
FIG. 7 is a rough plan view of the third embodiment of the handle for a fishing rod according to the present invention.

Further, FIG. 7 shows the third embodiment of the present invention.

This embodiment is different from the above-mentioned ones in that the bulgy portion 6c of the reel-depositing surface 6 formed on the reel-attaching portion 3 is of a square shape.

This embodiment is, like the second one, is suitable as a handle for attaching a big reel.

Figure 8:
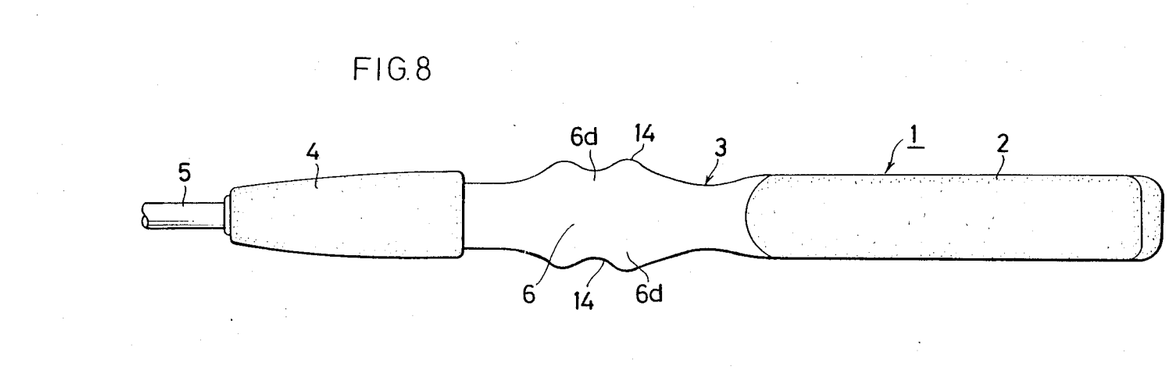
FIG. 8 is a rough plan view of the fourth embodiment of the handle for a fishing rod according to the present invention.

FIG. 8 shows the fourth embodiment of the present invention.

In this embodiment, a concavo-convex portion 14 for the fingers to rest on is formed on the bulgy portion 6d of the reel-depositing surface 6 which bulges in right and left directions as in FIG. 1.

This type of handle can let each finger fit with the reel-attaching portion 3 very well.

FIGS. 9 to 15 show the fifth embodiment of the present invention.

Figure 9:
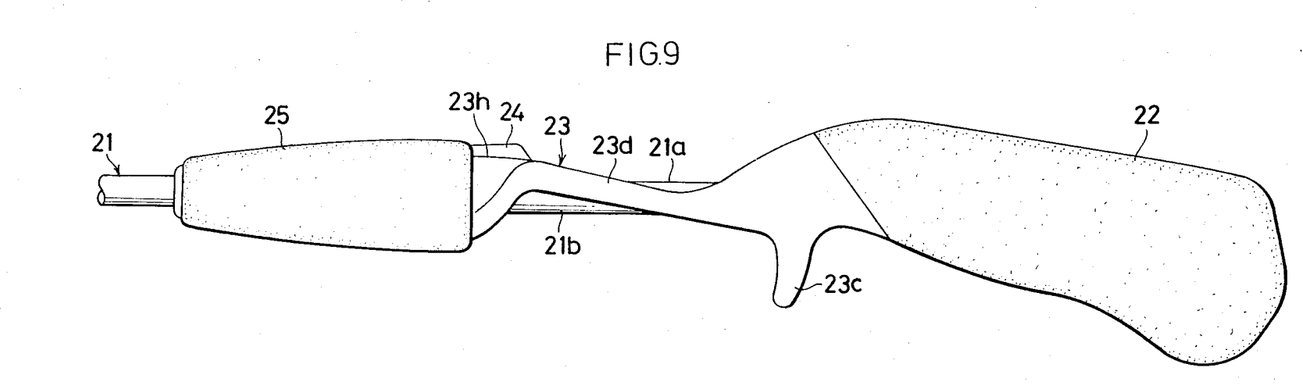
FIG. 9 is a plan view showing the essential parts of the fourth embodiment of the handle for a fishing rod according to the present invention.
Figure 10:
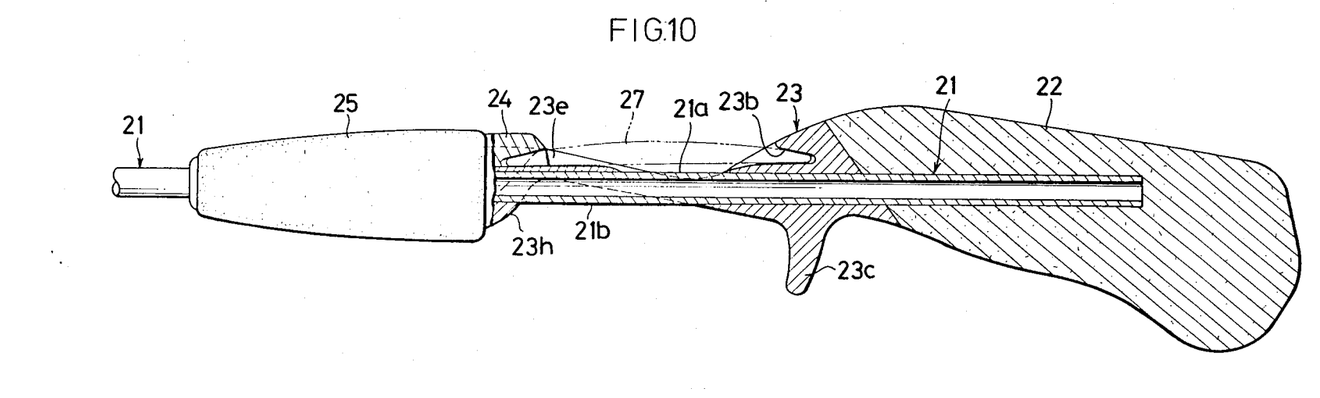
FIG. 10 is a partly-cut side view showing the essential parts of FIG. 9.

In this embodiment, as shown in FIGS. 9 and 10, the fishing rod 21 is inserted and fixed with an adhesive agent inside the rear-grip 22, to the front portion of which is combined with an adhesive the reel-attaching portion 23 throuh which the fishing rod 21 is inserted.

The rear grip 22 is formed of synthetic resin foam plastics, cork or geracon rubber.

Figure 11:
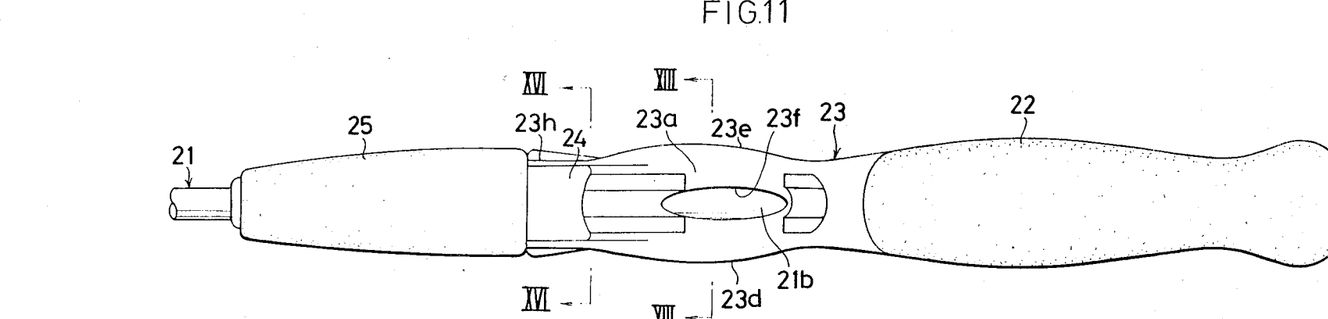
FIG. 11 is a plan view of FIG. 9.
Figure 12:
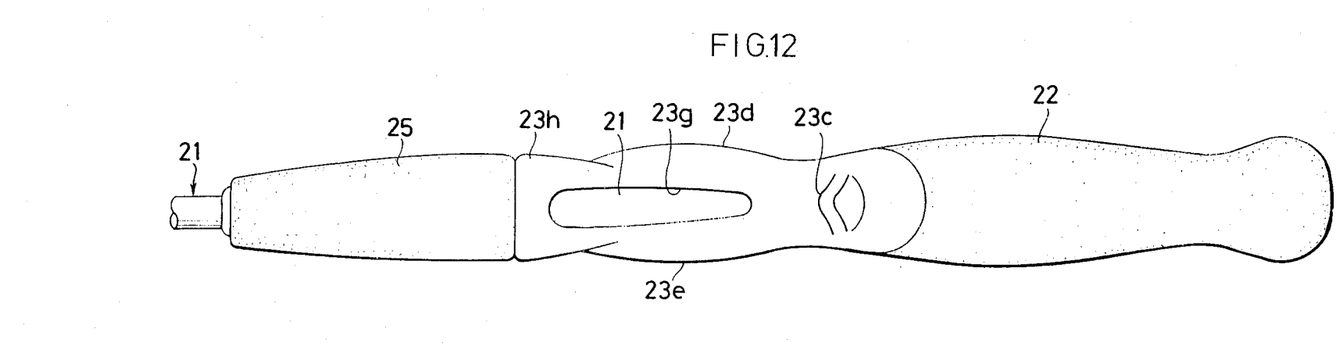
FIG. 12 is a view showing the rear side of FIG. 9.
Figure 13:
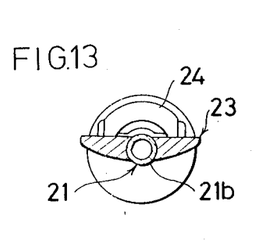
FIG. 13 is a rear view of FIG. 11 cut along the line XIII—XIII.
Figure 14:
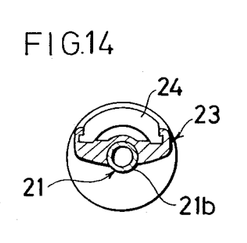
FIG. 14 is a rear view of FIG. 11 cut along the line XIV—XIV.

The upper surface of the reel-attaching portion 23 is, as shown in FIGS. 10 and 11, formed with a reel-depositing surface 23a and a hollow 23b for inserting the reel foot. The lower surface of the reel-attaching portion 23 is, as shown in FIGS. 10 and 12, formed in a downwardly projecting manner with a trigger 23c upon which a finger is placed.

Further, the reel-attaching portion 23 is provided with two side parts 23d and 23e pinching the fishing rod 21 from both sides. As you can see, they are tapered to extend forwardly with their front portions higher than the approximate center line of the fishing rod and with their back portions lower than that.

The upper and lower sides of the side portions 23d and 23e are respectively provided with long slits 23f and 23g over which the upper surface 21a and the lower surface 21b of the fishing rod 21 are exposed as shown in each drawing.

On the front end of each side portion 23d and 23e is provided a hold means 23h which fastens the fishing rod 21 and also prevents the rotation of the means 24 for attaching the reel-foot.

On the front side of the hold means 23h is formed an elongated male screw (not shown) which is fixed on the fishing rod 21. On the outer periphery of the male screw is set a female screw which moves the means 24 forwardly and backwardly. Further, on the outer periphery of the female screw is fixed the front grip 21 made of the same material as the rear grip 22, that is, synthetic resin foam plastics, cork or geracon rubber.

Figure 15:
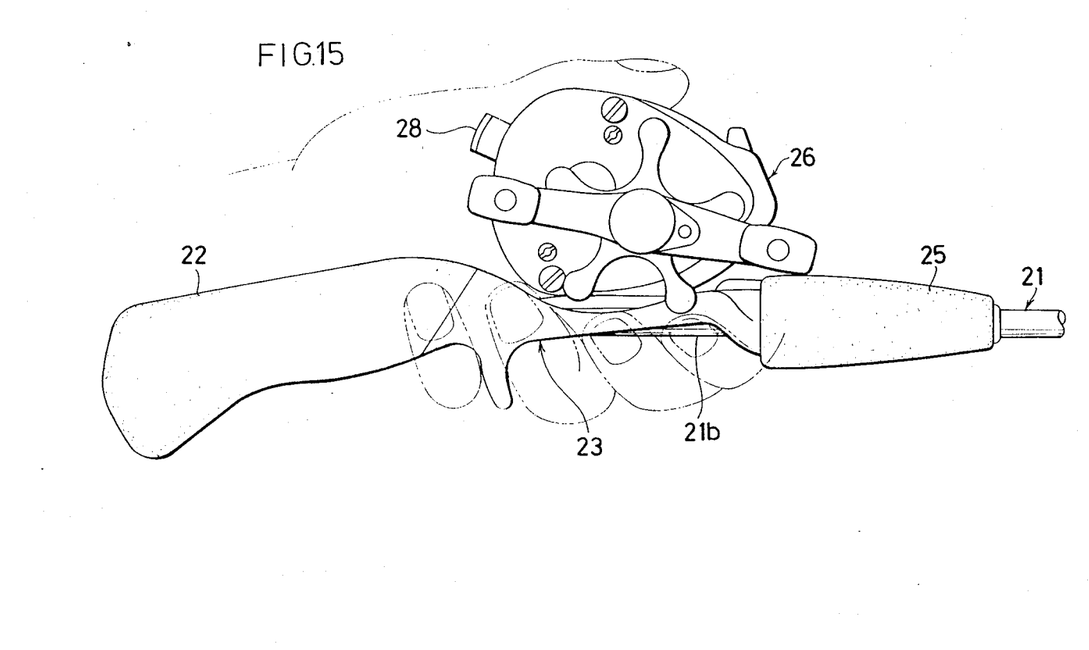
FIG. 15 is a side view showing the state where a reel attached to the handle for a fishing rod according to the present invention is held in the palm.

When the reel 26 is attached onto the reel-attaching portion 23 as in FIGS. 10 and 15, one side of the attaching plate 27 of the reel 26 is inserted into the hollow 23b for attaching the reel-foot, the other side of it being pressed by the plate 24 for fastening the reel-foot.

At the time of casting, the fishing rod handle as devised above according to the present invention has its trigger 23c pressed by the first finger and its rear grip 22 gripped by the other fingers.

At this time, the palming is very easily done because the reel 26 is positioned low as the reel-depositing surface 23a is formed near the fishing rod 21.

Further, when the reel 26 is grasped in the palm as illustrated in FIG. 15, the user can enjoy a very stable and comfortable grasp of it, because the side portions 23d and 23e with the fishing rod 21 placed between them are tapered so that they are high at their front ends and low at their rear ends, and the reel-attaching portion 23 is made thin for the lower surface 21c of the fishing rod 21 to expose itself, with the result that the first, second and third fingers can hold the handle firmly touching the fishing rod 21.

Further, as the first and second fingers are in direct touch with the lower surface 21c of the fishing rod 21, there is obtained an improvement in sensing the hit of the fish. This leads to a quick rod and reel performance when the fish hits, and therefore to the good fishing result.

Further it will be seen that, as the side portions 23d and 23e of the reel-attaching portion 23 are formed to be high at the front end and low at the back end with the lower surface 21c of the fishing rod 21 exposed, the thumb is positioned high enough on the clutch lever 28 of the reel 26 for an easy handling when the handle is gripped with the third finger pressed upon the trigger 23c.

It is possible to form the reel-depositing surface 23a on the attaching plate 27 of the reel 26 in such a manner that it is placed directly on the upper surface of the fishing rod 21.

It is further possible to make the front part of the trigger 23c thicker to reinforce the handle.

In the afore-mentioned embodiments, the rear-grips are fixed directly on the outer periphery of the fishing rod 21, but it is also possible to lengthen the reel-attaching portion 23 backwardly and fix the rear-grip 22 on the outer periphery of the lengthened portion.

Each of the above embodiments shows the construction in which part of the fishing rod is exposed over the upper and lower surfaces of the reel-attaching portion of the handle, but it should be noted that the present invention is not limited only to the handle of this construction.

What is claimed is:

1. A handle for a fishing rod having a reel-attaching portion positioned between front and rear grips, characterized in that a reel-depositing surface is formed on the upper surface of said reel-attaching portion, the right and left portions of said reel-depositing surface bulges horizontally to form bulgy portions, and the finger-placing surface of said reel-attaching portion on the opposite side of said reel-depositing surface has such a circular shape as to fit with the dispositions and the bending angles of the fingers.

2. A handle for a fishing rod as claimed in claim 1, characterized in that said bulgy portions to be formed on both sides of said reel-depositing surface are of such an oval shape that both front and rear portions thereof become smaller as they are closer to said front and rear grips, and also said bulgy portions are made wider than the reel foot.

3. A handle for a fishing rod as claimed in claim 1, characterized in that said finger-placing surface of said reel-attaching portion of the opposite side of said reel-depositing surface is made to have a circular phase with a much larger diameter than the outer diameter of the fishing rod towards the right and left edges of said bulgy portions from the exposed outer periphery of the fishing rod.

4. A handle for a fishing rod having a reel-attaching portion positioned between front and rear grips, characterized in that a reel-depositing surface is formed on the upper surface of said reel-attaching portion, a trigger for resting a finger is formed in a downwardly projecting manner, right and left side portions are formed on the reel-attaching portion so that the lower surface of the outer periphery of the fishing rod may be exposed over the front lower part of said trigger, said right and left sides are tapered so that they are higher than the approximately central line of said fishing rod at the front portion thereof and lower than that at the rear portion thereof.

* * * * *